United States Patent [19]

Aine

[11] 4,144,516
[45] Mar. 13, 1979

[54] SOLID STATE TRANSDUCER AND METHOD OF MAKING SAME

[76] Inventor: Harry E. Aine, Two Palo Alto Sq., Palo Alto, Calif. 94304

[21] Appl. No.: 817,556

[22] Filed: Jul. 21, 1977

Related U.S. Application Data

[63] Continuation-in-part of Ser. No. 671,680, Mar. 29, 1976, abandoned.

[51] Int. Cl.$^2$ .............................................. G01L 1/22
[52] U.S. Cl. ..................................... 338/2; 29/576 R; 29/580; 29/592 R; 29/610 SG; 338/4; 338/42; 357/26
[58] Field of Search ......... 29/610 SG, 576 R, 576 W, 29/580, 581, 582, 583, 592; 73/88.5 SD, 398 AR; 338/2, 4, 36, 41, 42, 5, 47; 156/662, 648; 357/26, 79

[56] References Cited

U.S. PATENT DOCUMENTS

| | | | |
|---|---|---|---|
| 3,328,653 | 6/1967 | Wolf, Jr. | 357/26 X |
| 3,448,424 | 6/1969 | Laimins | 338/2 X |
| 3,634,727 | 1/1972 | Polye | 357/26 X |
| 3,820,401 | 6/1974 | Lewis | 338/4 X |
| 3,909,924 | 10/1975 | Vindasius | 29/610 SG X |
| 4,016,644 | 4/1977 | Kurtz | 29/610 SG X |
| 4,021,766 | 5/1977 | Aine | 29/592 X |
| 4,071,838 | 1/1978 | Block | 29/592 R X |

*Primary Examiner*—Victor A. Dipalma
*Attorney, Agent, or Firm*—Harry E. Aine; Harvey G. Lowhurst

[57] ABSTRACT

Solid state dual leaf spring transducers are fabricated by batch photolithographic etching techniques from a monocystalline nonmetallic material, such as silicon. Each leaf spring structure includes a leaf spring portion surrounded by a support structure defined by an intervening region of the wafer disposed between adjacent leaf spring structures etched into the wafer. A pair of such leaf spring structures with their respective surrounding support structures are joined together in mutually opposed relation to form a composite dual leaf spring transducer structure of the type wherein a pair of leaf spring structures are mechanically coupled together in axially spaced relation along an axis of sensitivity for equal displacement along said axis of sensitivity in response to displacement of either one of the spring structures relative to the support structure. In one embodiment, a third wafer is interposed between the first two opposed wafers, such third wafer having apertures formed therein so that the leaf spring structures are coupled together through the apertures in the third wafer. In another embodiment, conductive capacitive patterns are formed on the leaf spring structures so as to provide a capacitor structure for sensing displacement of the leaf spring structure.

15 Claims, 14 Drawing Figures

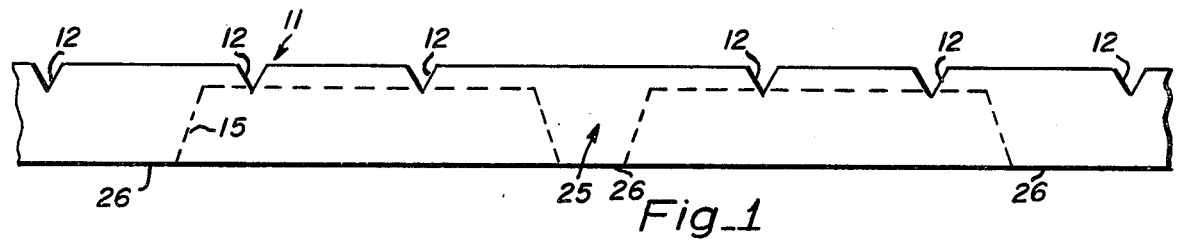
Fig_1
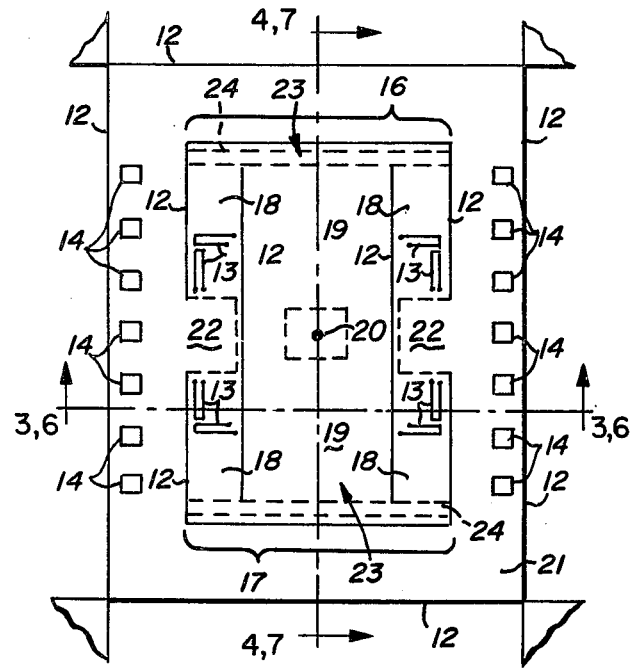
Fig_2
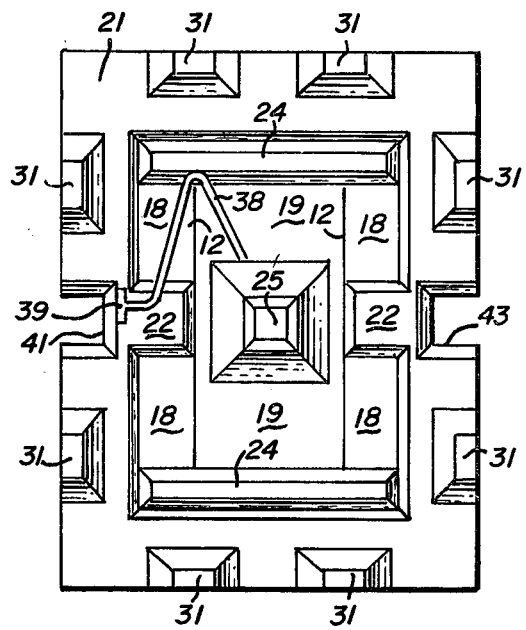
Fig_5
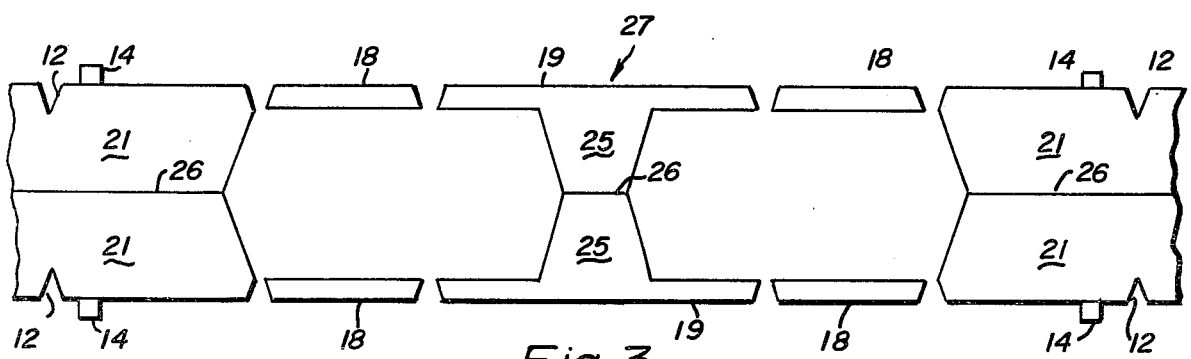
Fig_3
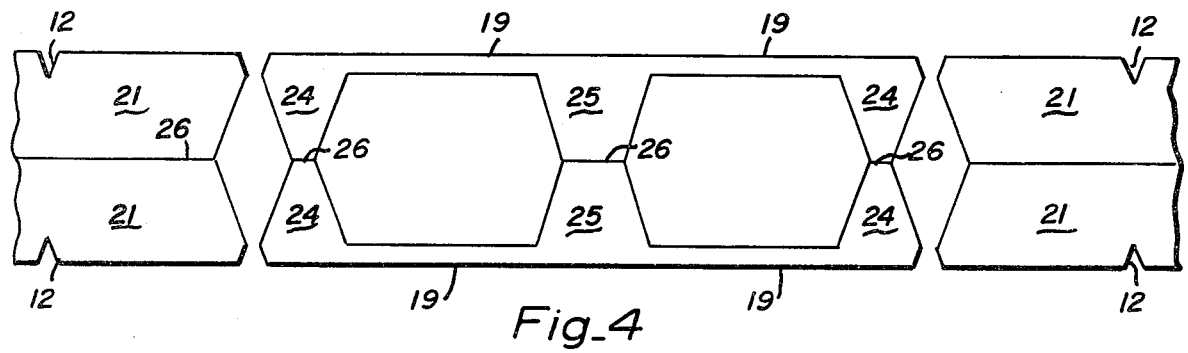
Fig_4

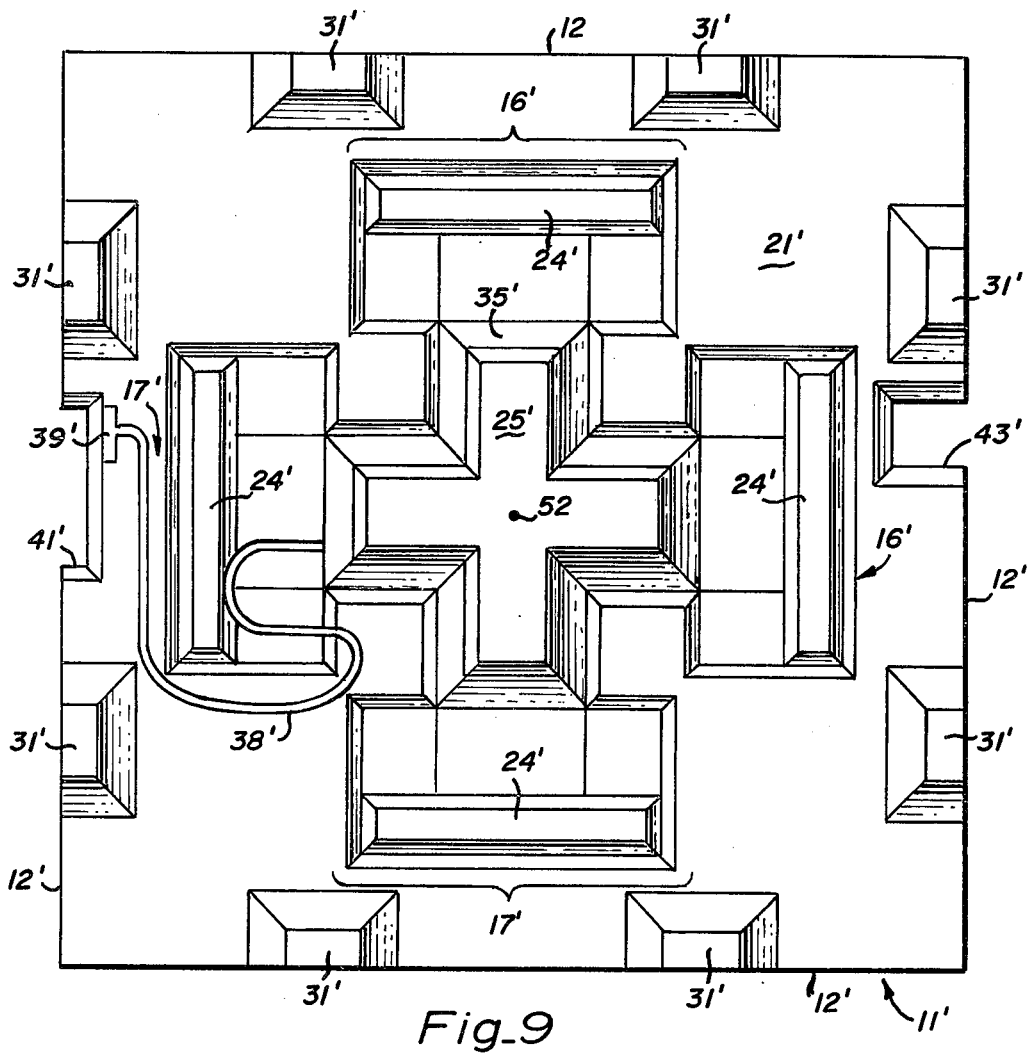
Fig_9
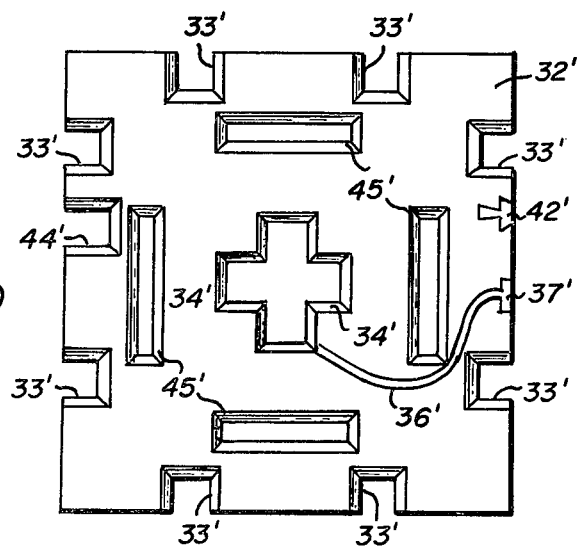
Fig_10

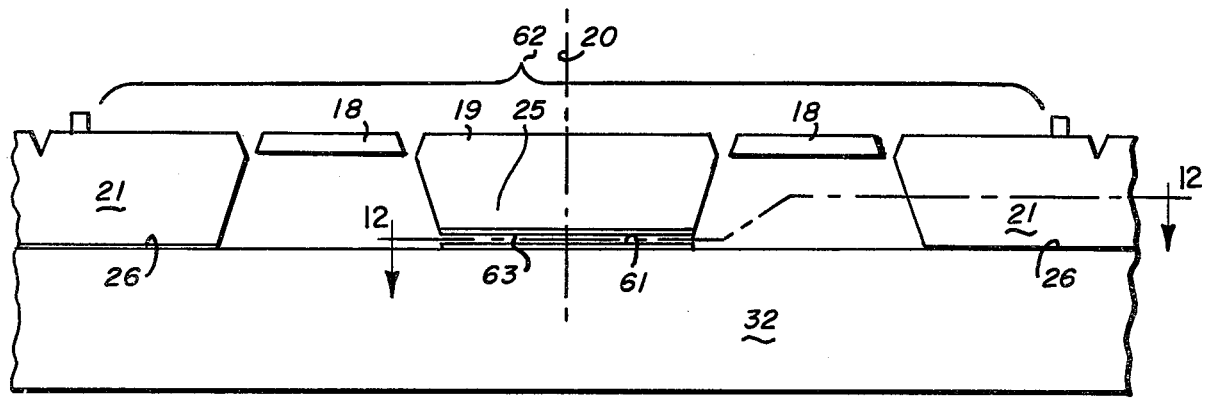
Fig. 11
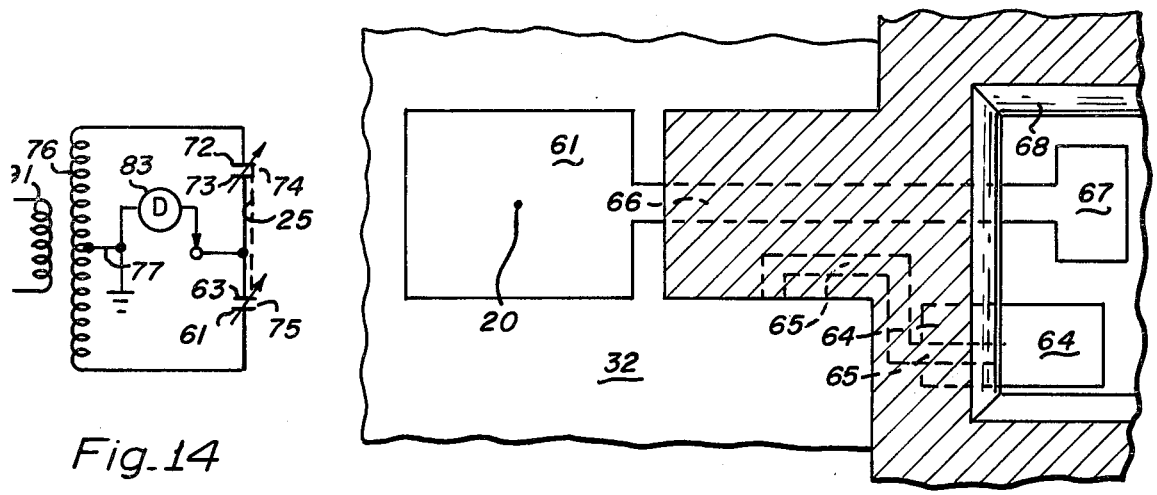
Fig. 14
Fig. 12
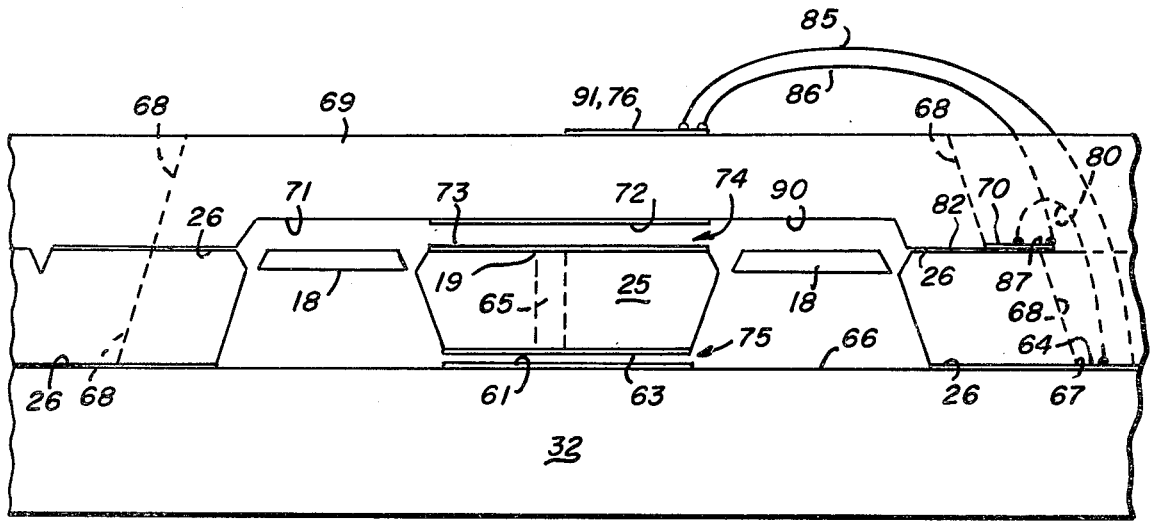
Fig. 13

SOLID STATE TRANSDUCER AND METHOD OF MAKING SAME

RELATED CASES

This application is a continuation-in-part of parent application U.S. Ser. No. 671,680 filed Mar. 29, 1976 and now abandoned in favor of the present invention.

BACKGROUND OF THE INVENTION

The present invention relates in general to solid state transducers of the leaf spring type and more particularly to such transducers that can be fabricated by batch photolithographic and etching techniques from a monocrystalline material.

DESCRIPTION OF THE PRIOR ART

Heretofore, solid state force transducers of the leaf spring type have been batch fabricated from a silicon monocrystalline wafer by means of photolithographic-etching techniques. More particularly, the top surface of a monocrystalline silicon wafer was etched through a photolithographic prepared mask to a relatively shallow depth to define the leaf spring structure, preferably of the double E-shape. The wafer was then etched from the back side to intersect a back side recess with the spring pattern of etched recesses in the front side to define the leaf spring structure supported from a surrounding support structure formed by the intervening regions of the wafer between adjacent leaf spring structures. Piezoresistive elements were diffused into the leaf springs in the region of maximum stress to derive an electrical output proportional to the force exerted on the leaf spring portion of the transducer. Such a transducer is disclosed and claimed in copending U.S. application Ser. No. 656,632 filed Feb. 9, 1976 now U.S. Pat. No. 4,071,838 issued Jan. 31, 1978.

It is also known from the prior art to provide a dual leaf spring force transducer of the type wherein first and second double E-shaped leaf springs have been supported from a housing via support bosses projecting from the inside walls of the housing. The two double E-springs were coupled together via a structure extending axially of the axis of sensitivity and centrally of the double E-spring structures and by additional structures extending axially between the outer ends of each of the double E-shaped springs. Such a structure has improved linearity and forms the subject matter of copending U.S. application Ser. No. 586,892 filed June 16, 1975 and now issued as U.S. Pat. No. 4,091,680 on May 30, 1978. This latter type of dual E-shaped spring transducer, in one embodiment, employed a differential capacitive structure interposed between the two double E-spring structures in capacitively coupled relation with the central structure interconnecting the two central regions of the axially spaced leaf springs to derive an output proportional to the displacement of the leaf spring structures relative to the support structure.

This prior art dual double E-spring transducer is relatively complicated to manufacture and it is desired to obtain an improved method for fabricating such transducers.

SUMMARY OF THE PRESENT INVENTION

The principal object of the present invention is the provision of an improved solid state transducer of the leaf spring type and of a batch method for fabricating same.

In one feature of the present invention, first and second leaf spring structures, as supported from support structures, are mechanically coupled together in axially spaced mutually opposed relation so that the first and second leaf spring structures are coupled together for deflection in unison relative to the surrounding support structures in response to deflection of either of said first and second spring structures.

In another feature of the present invention, a capacitive detector structure is provided for detecting displacement of the leaf spring.

In another feature of the present invention, first and second wafers, having arrays of leaf springs and associated support structures formed therein, are joined together in mutually opposed relation to define an array of dual leaf spring transducers.

In another feature of the present invention, a wafer having an array of apertures formed therein, defining capacitive detector elements and passageways, is interposed between a pair of wafers having arrays of leaf spring structures formed therein, such leaf spring structures being mechanically coupled together through said apertures in the said intervening wafer to form an array of dual leaf spring transducers employing capacitive detector means.

In another feature of the present invention, apertures formed in the wafer interposed between the leaf spring wafers cooperate with elements projecting from the leaf spring wafers for laterally locating the three wafers in aligned relation, thereby facilitating batch fabrication of dual leaf spring transducers.

Other features and advantages of the present invention will become apparent upon a perusal of the following specification taken in connection with the accompanying drawings wherein:

BRIEF DESCRIPTION OF THE DRAWINGS

FIG. 1 is a transverse schematic sectional view of a portion of a wafer depicting the process of forming the leaf spring structures therein, FIG. 2 is a plan view of a leaf spring transducer incorporating features of the present invention, FIG. 3 is an enlarged schematic sectional view of a portion of the structure of FIG. 2 taken along line 3—3 in the direction of the arrows, FIG. 4 is an enlarged schematic sectional view of a portion of the structure of FIG. 2 taken along line 4—4 in the direction of the arrows, FIG. 5 is a bottom view of an alternative embodiment of the structure of FIG. 2, FIG. 9 is a view similar to that of FIG. 5 depicting an alternative embodiment of the present invention, FIG. 10 is a view similar to that of FIG. 8 depicting an alternative embodiment of the present invention, FIG. 11 is a view similar to that of FIG. 3 depicting an alternative embodiment of the present invention, FIG. 12 is a partial sectional view through the structure of FIG. 11 taken along line 12—12 in the direction of the arrows, FIG. 13 is a view similar to that of FIG. 11 depicting an alternative embodiment of the present invention, and FIG. 14 is a schematic circuit diagram of the capacitive detector circuit utilized in the structures of FIGS. 11-13.

DESCRIPTION OF THE PREFERRED EMBODIMENTS

Figure 6:
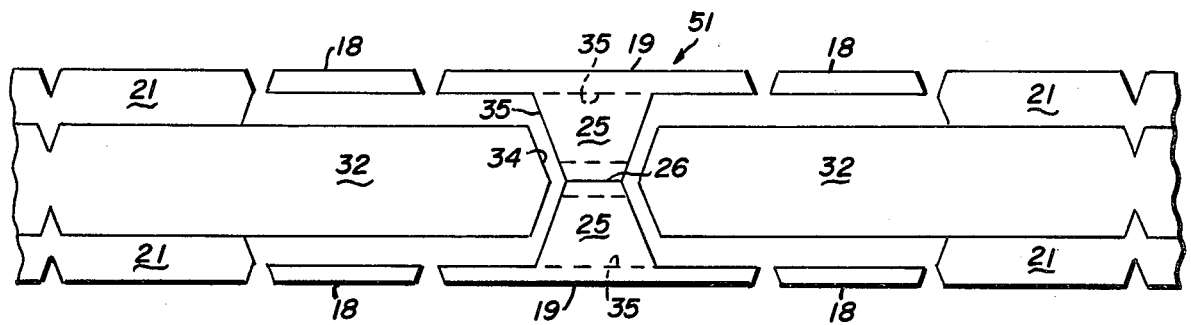
FIG. 6 is a view similar to that of FIG. 3 depicting an alternative embodiment of the present invention.

Referring now to FIG. 1 there is shown a nonmetallic monocrystalline wafer 11 as of silicon, germanium, quartz or the like. The wafer is etched from the top side, which is preferably the <110> crystallographic plane for diamond cubic materials such as silicon, with a pattern of grooves 12 corresponding to a leaf spring pattern and a surrounding support structure pattern, as more clearly shown in FIG. 2. More particularly, the wafer is etched by conventional photolithographic-etching techniques to a relatively shallow depth as of one to several mils in a wafer having a typical thickness falling within the range of 10 to 20 mils. The etching is preferably accomplished by means of an anisotropic etchant, such as an aqueous solution of sodium hydroxide for silicon. In addition, the etched grooves 12 are preferably aligned parallel with certain crystallographic axes of the crystal. More particularly, the grooves 12 are preferably aligned with the $<01\bar{1}>$ and $<0\bar{1}\bar{1}>$ crystallographic axes.

Upon completion of the etching of the grooves 12, piezoresistive elements 13 are diffused into the surface of the wafer 11 in locations corresponding to maximum stress of the spring structure to be formed. The piezoresistive elements 13 are preferably provided in two sets, one parallel to the direction of maximum stress and the other normal thereto in order to derive a temperature compensated output electrical signal which is dependent upon the stress or the displacement of the spring structure. The piezoresistive elements are interconnected to a plurality of contact pads 14 via patterns of intraconnect metallization utilizing the conventional photolithographic techniques.

The electrical circuitry on the top surface of the wafer 11 is protected by suitable protective coatings such as wax while the bottom major surface of the wafer 11 is etched with the anisotropic etchant in accordance with a pattern indicated by dotted line 15, such back side recess intersecting with the front surface grooves 12 to define the leaf spring structure and surrounding support structure.

The leaf spring structure includes a pair of E-shaped leaf spring portions 16 and 17 disposed in mutually opposed relation on opposite sides of an axis of maximum compliance or sensitivity 20 extending perpendicular to the plane of the leaf spring structure and centrally thereof. More particularly, each of the E-shaped leaf spring portions 16 and 17 includes a pair of outer leg portions 18 disposed on opposite sides of a central leg portion 19. The inner ends of the outer legs 18 are supported from a surrounding base support structure 21 via inwardly directed boss portions 22. The outer ends of the outer legs 18 are connected together and to the outer ends of the central leg portion 19 via leaf spring portions 23. In addition, portions 23 are further strengthened against torsion forces by means of strengthening bar portions 24 dependent from the bottom side of the leaf spring structures 16 and 17. Furthermore, a dependent portion 25 is formed centrally of the central leaf spring portions 19 and coaxial with the axis of sensitivity 20. The strengthening bars 24 and the central dependent portion 25 are more clearly shown in FIG. 5.

The lower surfaces of the annular support structure 21, the dependent support bars 24 and the central dependent projection 25 are preferably metallized at 26 with a suitable metallization such as a layer of chromium followed by a layer of gold. Two such wafers, each having an array of such spring structures and accompanying support structures formed therein and preferably suitably metallized as aforedescribed, are then joined together at 26 in mutually opposed relation as shown in FIGS. 3 and 4, preferably by conventional gold-tin utectic die attach techniques or by conventional techniques employed in the semiconductor industry for joining elements together, such as by adhesive, soldering or brazing and the like, to form a dual double E-shaped spring transducer 27. The transducers are still in the wafer form and may be probed for testing purposes. Thereafter, the wafers are diced to separate the individual transducers 27 which may then be subsequently mounted, as by conventional die attach techniques, to a suitable support structure. The advantage of the dual double E-spring transducer 27, as contrasted with a single transducer of the type shown in FIG. 2, is that the transducer produces a more linear output.

Referring now to FIGS. 5-8 there is shown an alternative embodiment of the present invention. The transducer embodiment of FIGS. 5-8 is substantially the same as that of FIGS. 3 and 4 with the exception that a differential capacitor pick-up structure is employed for producing the output signal in lieu of the piezoresistive elements 13 employed in the embodiment of FIGS. 3 and 4. More particularly, the wafers 11 are etched as before with the exception that, as shown in FIG. 5, the annular support structure 21 is castillated by forming, in the back side etching steps, a plurality of projections 31 depending from the outer periphery of the support structure 21. The projections 31 have a depth equal to half the thickness of a capacitive detector wafer 32 which is interposed between the mutually opposed double E-spring structures.

Figure 8:
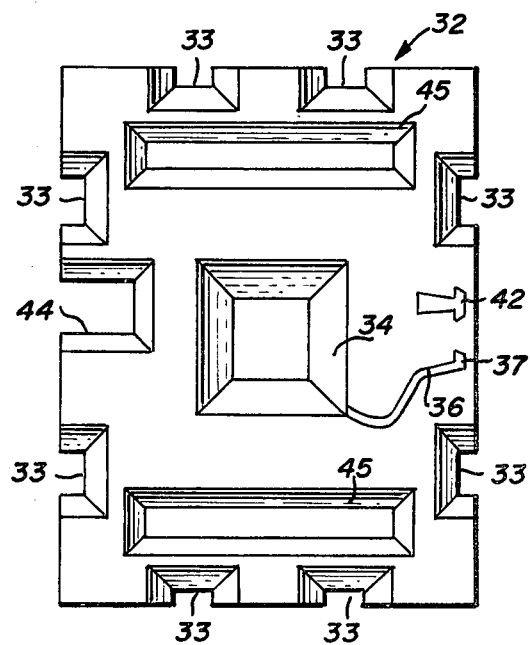
FIG. 8 is a reduced plan view of the capacitive structure utilized in the embodiments of FIGS. 6 and 7.

The capacitive wafer 32 comprises a monocrystalline wafer of the same material as that utilized for wafers 11 and is etched with a pattern of apertures as shown in FIG. 8. More particularly, the capacitive detector wafer 32 includes an array of structures 33 etched into the wafer from opposite sides for mating with the projections 31 depending from the annular region of the support structure 21. The apertures 33 and particularly the etched surfaces thereof which mate with the corresponding side surfaces of the projections 31 serve as means for precisely laterally locating the mutually opposed leaf spring structures relative to each other and relative to the capacitive wafer. Not all of the projections 31 and holes 33 need be utilized for locating, for example, only two pairs of such projections 31 and holes 33 per matched set of wafers are sufficient. The inner ends of the projections 31 of the two mutually opposed leaf spring structures mate to provide precise axial location and are joined together as above described at 26 forming a bond therebetween. In addition, the side walls of the projections 31 are metallized as are the side walls of the apertures 33 for providing a bonding interface therebetween in the manner as previously described by the bonds at 26.

In addition, a central aperture 34 is etched into the capacitive wafer 32 in alignment with the central projections 25 and in closely radially spaced relation thereto for defining differential capacitive structures and permitting the two projections 25 to be joined together at 26 through the aperture 34. The aperture 34 is etched from opposite sides so as to provide faces which are parallel to the faces of the adjoining projections 25. The inside surface of the aperture 34 is coated with a layer of metallization, as of aluminum, to define a common plate of the differential capacitive structure.

The other two capacitive plates are defined by rings of metallization 35 deposited surrounding the respective projections 25. Each of the rings 35 terminates short of but near to the midplane 26 so as to define first and second variable capacitors formed by the capacitance between the respective rings 35 and the metallized aperture 34. A pattern of metallization 36 on the capacitive wafer 32 makes contact to the layer of metallization on the inside surface of the aperture 34, such pattern 36 extending to a contact pad 37 at the outer periphery of the individual capacitive wafer portions 32.

Figure 7:
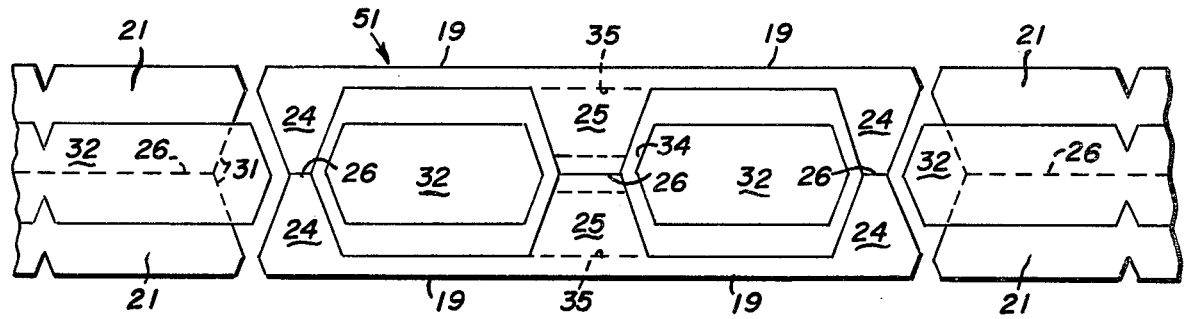
FIG. 7 is a view similar to that of FIG. 4 depicting an alternative embodiment of the present invention.

Similarly, a conductive intraconnect pattern of metallization is formed on the inside of each of the leaf spring structures as shown in FIG. 5 at 38 for intraconnecting the ring of metallization 35 and a contact pad 39 at the lip of an aperture 41 in the side of the base support structure 21. The capacitive wafer includes a metallized contact pad 42 formed near the outer edge of each of the capacitive wafer portions 32 in the vicinity of the contact pad 37. Contact pad 42 mates with pad 39 when the bottom spring structure is flipped over to serve as the top spring structure, i.e., when the two spring wafers 11 and the capacitive wafer 32 are mounted together in mutually opposed relation as shown in FIGS. 6 and 7. The contact 39 (see FIGS. 5 and 8) thus makes contact to the underlying contact pad 42 and brings the metallization out for probing access through aperture 41 to the exposed contact pad 42 on the intermediate capacitive wafer 32. The aperture 41 is also elongated to expose contact 37 for probing contact through the top or upper most spring wafer 11. A second aperture 43 is provided in the support frame structure 21 on the opposite side of the contact pad 39 so that when the wafer is flipped over to serve as the upper most spring wafer 11, aperture 43 exposes the pad 39 on the lower or bottom spring wafer. The capacitive wafer portion 32 also includes an aperture 44 in vertical registration with aperture 43 when the wafer is serving as the top wafer of the sandwich.

Thus, when the top and bottom spring wafers 11 are secured to the intermediate capacitive wafer 32, contact pads 42 and 37 are exposed through aperture 41 for making contact to the upper capacitive ring 35 and to the common capacitor plate 34. The lower contact pad 39 is exposed through aligned apertures 43 and 44 for making contact to the lower capacitive ring 35 so that the composite transducer structure 51 can be tested or probed through the apertures 41, 43 and 44.

The strengthening bar portions 24 pass through aligned apertures 45 in the capacitive wafer portion 32, such bar portions 24 being joined to the mutually opposed bar portions at 26 in the manner as previously described with regard to the embodiments of FIGS. 3 and 4. After the composite transducers 51 have been probed and tested in the wafer, the wafers are diced by any one of a number of conventional techniques to separate the individual transducers 51.

Referring now to FIGS. 9 and 10 there is shown an alternative embodiment of the present invention similar to that shown in FIGS. 5-8 with the exception that instead of a double E-spring structure each leaf spring structure includes four E-shaped leaf springs arranged at 90° intervals about the axis of sensitivity or maximum compliance 52. Primed numerals have been used throughout FIGS. 9 and 10 to identify corresponding elements to those elements previously described with regard to FIGS. 5-8. The top and bottom wafers 11' are identical and joined together in mutually opposed relation through the apertures in the capacitive wafer 32' in the manner as previously described with regard to the embodiments of FIGS. 5-8. The advantage to the transducer of FIGS. 9 and 10 is that it has greater resistance to cross-coupling of forces into the deflection of the spring structure along the axis of sensitivity 52 than that of the double E-springs of FIGS. 5-8.

Referring now to FIGS. 11 and 12 there is shown an alternative transducer employing a capacitive detector. More particularly, the structure of FIGS. 11 and 12 is the same as that previously described with regard to FIG. 6 with the exception that the capacitive detector plate 32 is not apertured and the capacitive detector structure is formed by a pattern of metallization 61 formed on the upper surface of the capacitive detector wafer 32. In addition, the dependent portion 25 formed in the center of the E-shaped leaf spring structure has its bottom surface at 63 metallized in alignment and registration with the metallization pattern 61 formed on the capacitive wafer 32 to define therebetween a capacitor. The capacitive plate metallization layer 63 makes electrical contact to a contact pad 64 deposited on the upper surface of the capacitive wafer 32 in registration with a pattern of metallization 65 formed on the bottom side of the E-shaped spring structure 62 in the manner as previously described with regard to FIG. 5, at 38 and 39, so that when the spring structure 62 is joined to the capacitive wafer 32, an electrical connection is made between pad 64 and the metallized capacitive detector plate 63 formed on the bottom surface of the central projection 25.

The capacitive pattern of metallization formed on the wafer 32 includes a lead portion 66 and a pad portion 67. Both pad 67 and pad 64 are in registration with an aperture 68 formed in the support structure 21 so that the pads 67 and 64 can be probed when the wafers have been joined together in mutually opposed relation at the joint 26. The mutually opposed patterns of metallization between layers 61 and 63 define the capacitor (capacitive detector member).

When the central region 25 of the double E-spring structure 62 is displaced due to a force exerted on the transducer, the capacitance between capacitive plates 61 and 63 changes and this change in capacitance is detected to give a measure of the degree of displacement of the central region of the detector leaf spring 62 along the axis of sensitivity 20.

Referring now to FIGS. 13 and 14, there is shown an alternative embodiment of the present invention. The structure of FIG. 13 is similar to that of FIGS. 11 and 12 with the exception when a second capacitive wafer 69, as of silicon, is recessed at 71 the recess 71 is in alignment with the spring structures 18 and 19 and includes a pattern of metallization at 72 in vertical alignment with and essentially coextensive with an upper pattern of metallization 73 formed on the upper surface of the central spring structure 19. Mutually opposed areas of the patterns 61, 63, 72 and 73 are approximately equal and the spacing between the layers of metallization 72 and 73 and 61 and 63 are approximately equal to define a pair of capacitive detectors 74 and 75.

The capacitors 74 and 75 are connected across an RF transformer secondary inductive winding 76 which is preferably center tapped at 77 to form an RF ground. Capacitive plates 63 and 73, as carried from opposite sides of the central leg portion 19 of the E-spring, are connected together at 78 via lead 65 and pad 64 wire bonded via wire lead 80 through hole 68 to a pad 70 on the top of support 21, which in turn is connected by a pattern of lead metallization 82, similar to that shown in FIG. 5 at 38 and 39 and carried from the upper surface of the E-spring structure 62. The outer capacitor plates 61 and 72 are connected to the opposite ends of the secondary transformer winding pattern of metallization 76 on the top of the upper wafer 69 via wire bond leads 85 and 86 interconnecting pads 67 and 87. The pattern of lead metallization 90 brings the upper plate 72 to pad 87 for making electrical connection thereto in the manner as previously described with regard to metallization lead 65 and pad 64 and 38 and 39 to pad 42.

The secondary inductive winding 76 is excited inductively by means of a primary winding 91 which is metallized on the upper surface of upper capacitive wafer 69, as shown at 91 and 76, utilizing conventional printed circuit inductive coupling patterns of metallization. A detector 83 is connected between the center tap 77 of the primary winding and terminal 78 for detecting displacement of the central region of the E-spring 62 along the axis of sensitivity 20 in response to a force applied to the transducer.

The circuit of FIG. 14 forms a bridge network and any displacement of the central region of the spring 62 relative to the support structure 21 including the capacitive wafers 32 and 69 results in an unbalancing of the bridge which is detected. The magnitude of the output signal detected by detector 83 is a function of the magnitude of the displacement along the axis of sensitivity 20, whereas the sign of the unbalance of the bridge is a function of the sense of the force applied to the transducer.

One of the advantages of the capacitive detector as exemplified by the structures of FIGS. 6–14 is that the transducer does not have to include any active semiconductive elements. It may comprise merely passive elements, such as the capacitive detector and the interconnect layers of metallization. The more temperature sensitive elements such as amplifiers, oscillators and the like may be detached and isolated in an environment more conducive to their longevity, whereas the transducer itself may be subjected to a relatively hostile environment of temperature, vibration and the like.

What is claimed is:

1. In a method for fabricating a solid state transducer of the type having a leaf spring structure supported from a support structure in axially spaced relation along an axis of sensitivity, the steps of:

forming a leaf spring structure by recessing through a major face of first and second wafer portions in accordance with a predetermined leaf spring pattern to define first and second leaf spring structures having deflectable portions supported from respective first and second support structures which allow deflection of said deflectable portions of said leaf spring structures along an axis of sensitivity relative to said support structures in response to a force applied to said leaf spring structures; and joining together said first and second leaf spring structures and said respective first and second support structures in spaced apart relation along an axis of sensitivity so that said first and second leaf spring structures are deflected along the axis of sensitivity by like amounts relative to said respective first and second support structures in response to deflection of either of said first and second spring structures along said axis of sensitivity.

2. The method of claim 1 including the step of, interposing a capacitive detector means between said deflectable portions of said first and second leaf spring portions in fixed relation relative to said first and second support structures for detecting displacement of said deflectable first and second leaf spring portions relative to said support structures.

3. The method of claim 1 wherein said first and second leaf spring patterns each include at least first and second coplanar E-shaped leaf spring portions each having a pair of outer leaf spring leg portions disposed on opposite sides of a central leaf spring leg portion all of said leg portions extending outwardly from said axis of sensitivity of the spring structure, said outer leg portions being fixedly connected to said central leg portions at their outer ends for deflection therewith, the inner legs of said outer leg portions being fixedly connected to said support structures and the inner ends of said central leg portions being connected together for deflection along the axis of sensitivity relative to said support structure; and wherein the step of joining together individual ones of said leaf spring structures includes the step of joining together said central leg portions of said first and second leaf spring structures via projections extending outwardly from the plane of said respective first and second leaf spring structures and from said respective outer ends of said outer leg portions thereof into mutually opposed engaging relation one with the other.

4. The method of claim 3 wherein the step of joining together individual ones of said leaf spring structures includes the step of joining together said outer ends of respective outer leg portions of said first and second leaf spring structures via projections extending outwardly from the plane of said respective first and second leaf spring structures and from said respective outer ends of said outer leg portions thereof into mutually opposed engaging relation one with the other.

5. The method of claim 2 wherein said interposed capacitive detector means includes a third wafer portion and including the step of aperturing said third wafer portion through a major face thereof in alignment with the central portion of respective ones of said first and second leaf spring structures to be joined together, and wherein the step of joining said first and second leaf spring structures together includes the step of joining said first and second leaf spring structures together through said aperture in said apertured capacitive detector means.

6. The method of claim 4 interposing a capacitive detector means between said deflectable portions of said first and second leaf spring portions in fixed relation relative to said first and second support structures for detecting displacement of said deflectable first and second leaf spring portions relative to said support structures, and wherein said interposed capacitive detector means includes a third wafer portion and including the step of, aperturing said third wafer portion in alignment with said projections extending outwardly from the plane of said first and second leaf spring structure and from said respective outer ends of said outer leg portions thereof which are to be joined together, and wherein the step of joining said first and second leaf spring structures together includes the step of joining said projections together through said apertures in said apertured capacitive detector means.

7. The method of claim 2 including the step of laterally aligning said first and second leaf spring structures and said capacitive detector means in mutually opposed relation by mating mutually opposed aligning surfaces formed on said mutually opposed support structures and said interposed capacitive detector means.

8. The method of claim 2 including the step of aperturing at least one of said first and second leaf spring support structures in vertical registration with patterns of metallization on said capacitive detector means for making electrical contact to said pattern of metallization through said apertured one of said leaf spring support structures.

9. The method of claim 8 including the step of aperturing said capacitive detector means in vertical registration with a second pattern of metallization on said other one of said leaf spring support structure for making electrical contact to said second pattern of metallization through said apertured capacitive detector means.

10. The method of claim 1 wherein said recessed first and second wafer portions which define said first and second leaf spring structures are recessed from a common wafer, and including the step of subdividing the wafer after the step of forming the spring structures therein to obtain said first and second leaf spring structures prior to the step of mechanically coupling said first and second leaf spring structure together.

11. The product made by the method of claim 1.

12. The product made by the method of claim 3.

13. In a method for fabricating a solid state transducer of the type having a leaf spring structure supported from a support structure, the steps of:

forming the leaf spring structure by recessing through a major face of a wafer in accordance with a predetermined leaf spring pattern to define a leaf spring structure having a deflectable portion supported from a support structure, said leaf spring structure allowing deflection of said deflectable portion of said leaf spring structure along an axis of sensitivity relative to said support structure in response to a force applied to said leaf spring structure; and forming a capacitive detector means between said deflectable portion of said leaf spring structure and a second structure fixed in relation relative to said support structure for detecting displacement of said deflectable portion of said leaf spring structure relative to said support structure.

14. The method of claim 13 wherein the step of forming a capacitive detector includes the step of interposing said deflectable portion of said leaf spring structure inbetween capacitive portions of said second structure which are fixed in relation to said support structure.

15. The product made by the method of claim 13.

* * * * *